United States Patent
Kitamura et al.

(10) Patent No.: US 7,261,673 B2
(45) Date of Patent: Aug. 28, 2007

(54) APPARATUS FOR CONTROLLING AUTOMATIC TRANSMISSION

(75) Inventors: Toshio Kitamura, Ageo (JP); Yuuichi Ichikawa, Ageo (JP); Akihisa Hayashi, Ageo (JP); Isao Okamoto, Ageo (JP); Osamu Isobe, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 344 days.

(21) Appl. No.: 10/531,917

(22) PCT Filed: Oct. 21, 2003

(86) PCT No.: PCT/JP03/13445

§ 371 (c)(1),
(2), (4) Date: Apr. 19, 2005

(87) PCT Pub. No.: WO2004/306091

PCT Pub. Date: Apr. 29, 2004

(65) Prior Publication Data

US 2007/0087897 A1    Apr. 19, 2007

(30) Foreign Application Priority Data

Oct. 21, 2002  (JP)  .................... 2002-306117
Oct. 28, 2002  (JP)  .................... 2002-313373
Oct. 28, 2002  (JP)  .................... 2002-313374

(51) Int. Cl.
   *F16D 48/06*  (2006.01)
(52) U.S. Cl. ..................................... 477/74

(58) Field of Classification Search ............. 477/71, 477/74, 75
See application file for complete search history.

(56) References Cited

U.S. PATENT DOCUMENTS 4,778,038 A * 10/1988 Ohkawa et al. ............... 477/74
5,441,462 A *  8/1995 Chan .......................... 477/74
5,957,805 A *  9/1999 Salecker et al. .............. 477/74

FOREIGN PATENT DOCUMENTS

| JP | 52-147936 | 12/1977 |
| JP | 58-196237 | 12/1983 |
| JP | S59-113551 | 7/1984 |
| JP | 60-17781 | 2/1985 |
| JP | 60-108819 | 7/1985 |

(Continued)

*Primary Examiner*—Dirk Wright
(74) *Attorney, Agent, or Firm*—Baker & Hostetler LLP

(57) ABSTRACT

In an automatic transmission having a clutch and a gear type transmission, a control unit for inputting detected signals from the operating condition detecting device, and outputting control signals to the gear changing device and the clutch drive device based on the detected signals. The control unit determines whether a stop intention condition of a driver is satisfied or not, and performs first gear change control for, if the stop intention condition is determined to be satisfied, disengaging the friction clutch and changing the gear type transmission to a neutral position, and second gear change control for, when an accelerator opening becomes greater than or equal to a predetermined value, after the friction clutch is disengaged and the gear type transmission is changed to the neutral position by the first gear change by the first gear change control, changing the gear type transmission to a gear according to a vehicle speed, and engaging the friction clutch.

15 Claims, 12 Drawing Sheets

FOREIGN PATENT DOCUMENTS

| | | |
|---|---|---|
| JP | 61-063369 | 3/1986 |
| JP | 61-146334 | 6/1986 |
| JP | 61-179250 | 7/1986 |
| JP | 63-001840 | 1/1988 |
| JP | 63-9922 | 1/1988 |
| JP | 63-034249 | 2/1988 |
| JP | 02-203535 | 7/1990 |
| JP | 04-087841 | 3/1992 |
| JP | H06-22658 | 3/1994 |
| JP | 07-236884 | 9/1995 |
| JP | 07 042824 | 10/1995 |
| JP | 09-079374 | 3/1997 |
| JP | 25629659 | 11/1997 |
| JP | 11-354349 | 12/1999 |
| JP | 2000-037097 | 2/2000 |
| JP | 2000-076369 | 3/2000 |
| JP | 2001-092119 | 3/2001 |
| JP | 2001-241542 | 9/2001 |
| JP | 2002-283882 | 10/2002 |
| JP | 2002-295517 | 10/2002 |
| JP | 2002-295527 | 10/2002 |

* cited by examiner

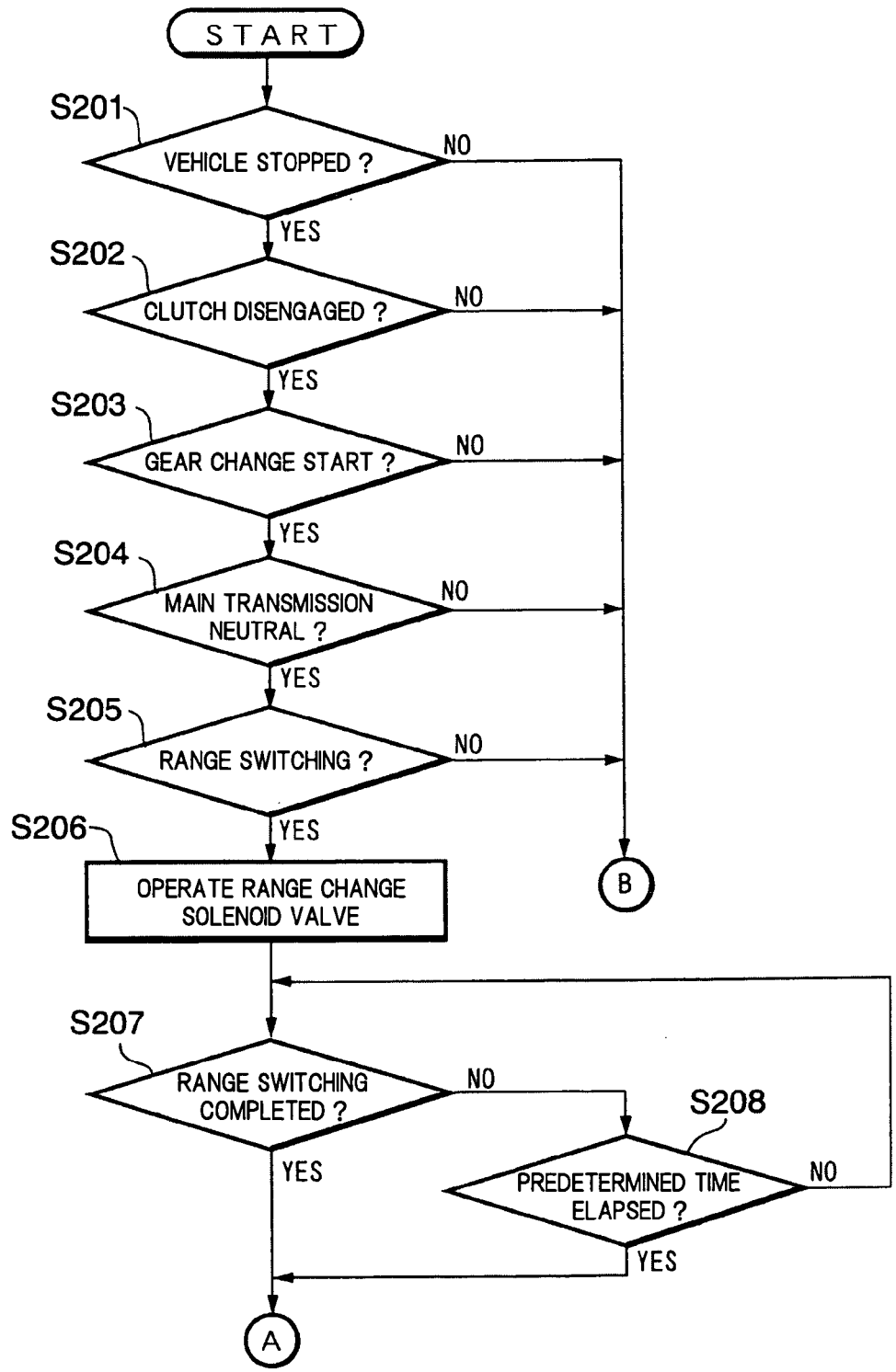

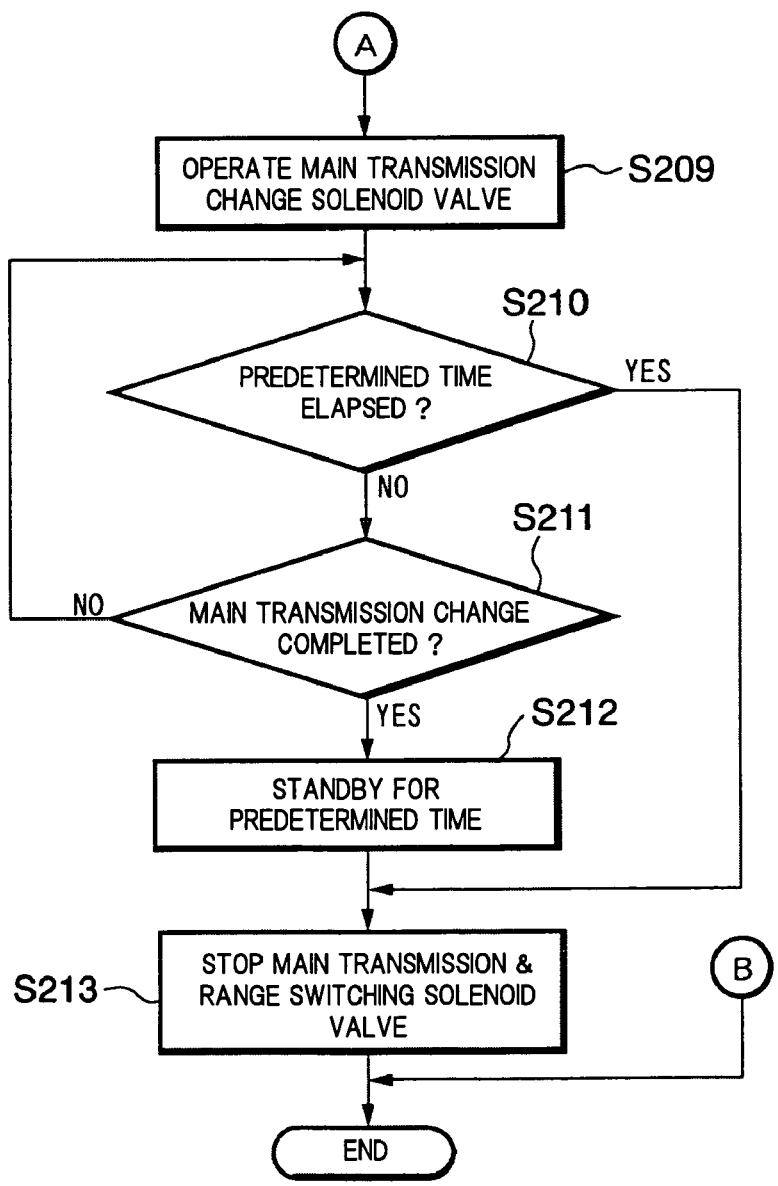

APPARATUS FOR CONTROLLING AUTOMATIC TRANSMISSION

BACKGROUND OF THE INVENTION

1. Field of the Invention

The present invention relates to an apparatus for controlling a gear type automatic transmission, and in particular, to an improvement in the speed of response of an automatic transmission provided with a clutch. Furthermore, the present invention relates to a technique for stopping a vehicle smoothly during idle-up control. Moreover, the present invention especially relates to a technique for eliminating batting states of a synchromesh mechanism in a sub transmission, in a gear change control device of a multi-stage transmission in which the sub transmission is connected to the output side of a main transmission.

2. Description of the Related Art

In recent years, mechanical automatic transmissions have been utilized that change gears automatically according to running conditions, by electronically controlling a friction clutch and a gear type transmission. In a mechanical automatic transmission, since there is no fluid clutch (torque converter) in the driving force transfer system from the engine to the driving wheels, the driving force transfer efficiency is high, and hence it is possible to improve fuel consumption. Furthermore, since there is no slipping sensation which is unique to a fluid clutch, the drivability is also improved.

In a gear type transmission, after the gear is changed to the neutral position, the driving force is disconnected from the engine. Therefore, in a mechanical automatic transmission, when stopping a vehicle from the drive stage, control is typically performed for engaging a friction clutch after changing the gear type transmission to the neutral position. Furthermore, in gear change control of a mechanical automatic transmission, as disclosed in Japanese Unexamined Patent Publication No. 2001-227630, and a prior application (Japanese Patent Application No. 2001-92119) by the present applicant, a technique is proposed in which when a gear type transmission is changed to the neutral position but immediately before the vehicle is stopped, an acceleration operation is performed in order to reaccelerate, the transmission is changed to an optimum gear according to the vehicle speed.

However, in a mechanical automatic transmission, the friction clutch is disengaged and engaged using an actuator. Therefore, at the time when the vehicle should be stopped, if when the gear type transmission is changed to the neutral position and the friction clutch is engaged, then even if an acceleration operation is performed in order to reaccelerate, the friction clutch needs to be disengaged again in order to change the gear. Hence the speed of response is not satisfactory.

Therefore, taking the above-described existing problems into consideration, the present invention makes it an object thereof to provide an apparatus for controlling an automatic transmission that does not require the friction clutch to be disengaged at the time of reacceleration, by maintaining a state in which the friction clutch is disengaged after a gear type transmission is changed to the neutral position when stopping a vehicle from the drive stage, so that the speed of response is improved.

On the other hand, a vehicle engine is provided with an idle-up device in order to stabilize the engine rotation during the time that the water temperature is low, and to complete warming up quickly. For the idle-up device, there is a manual idle-up device that increases the engine rotational speed at the time of idling by the driver controlling the idle volume, and an automatic idle-up device that increases the engine rotational speed at the time of idling up to a predetermined value (idle-up rotational speed) automatically depending on the temperature of the cooling water. Using these idle-up devices, the amount of fuel supplied is controlled so as to maintain the idle-up rotational speed, and hence the engine rotational speed is maintained almost constant as the workload changes.

Accordingly, in a vehicle in which an idle-up device and a mechanical automatic transmission as described above are provided, in the case where the idle-up rotational speed is set to be greater than the rotational speed at which changing to the neutral position takes place, when idle-up control is performed, even if the driver operates the brake in order to stop the vehicle from the drive stage, the engine rotational speed does not become less than or equal to the rotational speed at which changing to the neutral position takes place, and the gear type transmission does not go into the neutral position.

Accordingly, it is necessary for the driver to press the brake pedal down more strongly than necessary in order to force the engine rotational speed to drop, so that the engine rotational speed drops to become less than the rotational speed at which changing to the neutral position takes place, and the gear type transmission is set to the neutral position. By so doing, the sensation of operating the brake becomes unpleasant. Furthermore, there is a possibility that the load on the brake increases more than needed.

Therefore, taking the above-described existing problem into consideration, the present invention makes it an object thereof to provide an apparatus for controlling a mechanical automatic transmission that, in a vehicle provided with an idle-up device, determines that an engine is in an idle-up state based on the engine torque, when stopping the vehicle from the drive stage, and changes the gear to the neutral position, so that the vehicle stops smoothly.

While, in a tractor that pulls a trailer, since the weight of the vehicle is great, a multi-stage transmission is often installed in order to improve the running performance. In recent years, a type is becoming mainstream in which part of the gear train of the main transmission is shared by connecting a sub transmission to a main transmission in series, in order to achieve miniaturization. Furthermore, a technique has been also proposed that realizes an efficient automatic transmission by controlling a mechanical clutch and a multi-stage transmission electronically (refer to Japanese Unexamined Patent Publication No. 2001-165294).

For example, an example of a multi-stage transmission is one in which a splitter and a range are linked to a main transmission on its input side and output side respectively as sub transmissions, each gear of the main transmission is shifted by a half stage, and the gear ratio is expanded to multiple stages. In such a multi-stage transmission, in order to reduce the load on the synchromesh mechanism (inertia on the synchronizing side) in the range, gear change control is performed in which the range is changed when the main transmission is in its neutral, and after the range change is completed, the main transmission is changed to a predetermined gear.

Incidentally, in the case where the synchronizing side and the side to be synchronized are stopped completely in a typical synchromesh mechanism, there is a possibility that a "batting state" occurs, in which the chamfered ends of a synchronizer sleeve and a synchronizer ring interfere. If a batting state occurs, the synchronizer sleeve cannot slide in the direction of a gear on the side to be synchronized, so that the gear cannot be changed. Although the frequency of batting states occurring is reduced due to improvement of the chamfered end shape of the synchronizer sleeve and the synchronizer ring, it cannot be avoided reliably at present.

When the main transmission is set to the neutral position and the clutch is engaged, since relative rotation occurs between the main gear and the main shaft, the positional relationship between the chamfered ends of the synchronizer sleeve and the synchronizer ring changes, so that the batting state of the main transmission can be avoided easily.

However, in a multi-stage transmission, since the main transmission is changed after the range change is completed, if a batting state occurs in the range, changing of the main transmission cannot be started. Accordingly, since the main gear and the main shaft do not engage, even if the clutch is engaged, the main shaft does not rotate. Therefore, it is not possible to generate relative rotation between the main shaft and the range gear. Accordingly, when a batting state occurs in the range, then for example the vehicle must depart slowly while maintaining the range in a high speed gear in order to change the range.

While the vehicle is stopped, the main transmission is in the neutral position most of the time. Furthermore, when the vehicle stops from normal driving, there are many cases where the range is changed to a high speed gear. Accordingly, when the vehicle starts moving, there is a high possibility that the range must be changed from the high speed gear to the low speed gear in a state in which the main gear, the main shaft, and the range gear are not rotating, so problems as described above occur easily.

Therefore, taking the above-described existing problems into consideration, the present invention makes it an object thereof to provide a gear change control apparatus of a multi-stage transmission that, in a multi-stage transmission in which a sub transmission is connected to an output side of a main transmission, eliminates batting states of the synchromesh mechanism in the sub transmission by changing the content of the gear change control.

SUMMARY OF THE INVENTION

In order to achieve the above-described object, an apparatus for controlling an automatic transmission according to a first embodiment of the present invention comprises: a vehicle drive system in which a gear type transmission and a friction clutch are connected in series; a gear changing device for changing the gear type transmission; a clutch drive device for disengaging and engaging the friction clutch; an operating condition detecting device for detecting an operating condition of an engine; and a control unit for inputting therein detected signals from the operating condition detecting device, and outputting control signals to the gear changing device and the clutch drive device based on the detected signals, and is characterized in that the control unit determines whether a stop intention condition of a driver is satisfied or not, and performs first gear change control for, if the stop intention condition is determined to be satisfied, disengaging the friction clutch and changing the gear type transmission to a neutral position, and second gear change control for, when an accelerator opening becomes greater than or equal to a predetermined value, after the friction clutch is disengaged and the gear type transmission is changed to the neutral position by the first gear change control, changing the gear type transmission to a gear according to a vehicle speed, and engaging the friction clutch.

According to such a construction, when the stop intention conditions are satisfied, the friction clutch is disengaged by the clutch drive device, and this state is maintained while the gear type transmission is changed to the neutral position by the gear changing device. Then, the accelerator pedal is pressed down by the driver, and when the accelerator opening becomes greater than or equal to the predetermined value, the gear type transmission is changed to a gear according to the vehicle speed, and the friction clutch is engaged. Accordingly, even in the case where the vehicle decelerates, and then reaccelerates at a low speed, for example where it decelerates in response to a stop signal and then reacceleration is required due to the stop signal changing just before stopping of the vehicle when the gear type transmission is changed to the neutral position, since the friction clutch is maintained disengaged, it is not necessary to disengage it again, and thus it is possible to change to the drive stage straight away.

The second gear change control can determine that, when the vehicle speed is less than a first predetermined value, reacceleration (starting moving again) from an extremely low speed just before stopping is to be made. Then, by engaging the friction clutch gradually via a half clutch state, it prevents a shock and engine stall, at the time of the engagement, for example.

After the friction clutch is disengaged and the gear type transmission is changed to the neutral position by the first gear change control, if the vehicle speed is less than a second predetermined value, which is less than the first predetermined value, it is determined that the vehicle is stopped. In this case, the control unit can be constructed such that the gear type transmission is changed to a departure gear. In this case, when the vehicle stops, since the gear type transmission is changed to the departure gear, and the friction clutch is disengaged, it can depart by merely engaging the friction clutch.

After the friction clutch is disengaged, and the gear type transmission is changed to the neutral position by the first gear change control, the control unit can also perform a fourth gear change control for engaging the friction clutch if the accelerator opening is less than the aforementioned predetermined value, and the vehicle speed is less than a third predetermined value.

By so doing, it is possible to determine similarly that the vehicle is stopping after the friction clutch is disengaged, and the gear type transmission is changed to the neutral position. By engaging the friction clutch in a state in which the gear type transmission is changed to the neutral position, it is possible to handle the vehicle being stopped for a long time, for example.

The fourth gear change control can perform control such that after the friction clutch is disengaged and the gear type transmission is changed to the neutral position by the first gear change control, when a state in which the accelerator opening is less than the aforementioned predetermined value is maintained for a predetermined time, the friction clutch is engaged.

Using such a construction, it is similarly possible to determine that the vehicle is stopping. Moreover, by engaging the friction clutch in a state in which the gear type transmission is changed to the neutral position, it is possible to handle the vehicle being stopped for a long time, for example.

The stop intention determination can determine that stop intention conditions are satisfied when the gear type transmission is changed to a drive gear, a brake is operated, and an engine rotational speed is less than a predetermined value, or a vehicle speed is less than a fourth predetermined value.

That is, based on the gear change state of the gear type transmission, the operating condition of the brake, and the engine rotational speed or the vehicle speed, it can be determined easily whether the stop intention conditions are satisfied or not. In other words, in a state in which the gear type transmission is changed to the drive gear, if the brake operates, and the engine rotational speed or the vehicle speed drops, it can be determined that an operation to stop the vehicle is being performed. Therefore, in such a state, by determining that the stop intention conditions are satisfied, it is possible to apply control correctly, wherein the driver's intention is reflected.

An apparatus for controlling an automatic transmission according to a second embodiment of the present invention comprises: a gear change stage detecting device for detecting a gear change stage of a gear type transmission; a gear changing device for changing the gear of the gear type transmission;

an operating condition detecting device for detecting an operating condition of an engine; and a control unit for inputting detected signals from the operating condition detecting device, and outputting control signals to the gear changing device based on the detected signals, and is characterized in that the control unit determines whether a driver has an intention to decelerate or not based on a value detected by the operating condition detecting device, and determines whether the engine is in an idle-up state or not based on an engine torque detected by the operating condition detecting device, and performs gear change control to change the gear type transmission to a neutral position when determined that a gear change stage detected by the gear change stage detecting device is a drive gear, and that there is an intention to decelerate by the deceleration intention determination, and determined that the vehicle speed detected by the operating condition detecting device is less than a first predetermined value and that it is in an idle-up state by the idle-up determination.

Owing to such a construction, it is determined whether the engine is in an idle-up state or not based on the engine torque. When it is determined that the gear change stage of the transmission is a drive gear, the driver has an intention to decelerate, the vehicle speed is less than a first predetermined value, and the engine is in an idle-up state, the transmission is changed to the neutral position. By so doing, even in the case where the idle-up rotational speed is set to be greater than the gear change rotational speed in the neutral position, it is possible to change the transmission to the neutral position when stopping the vehicle from the drive stage.

For the deceleration intention determination, it can be determined based on the detected value of the operating condition detecting device, that the driver has an intention to decelerate when a brake is operated, or an accelerator opening is less than a second predetermined value. As a result, when stopping the vehicle from the drive stage, since either a braking operation is performed, or an operation is performed to release the accelerator pedal from being pressed down, when any one or both of such conditions is satisfied, it may be considered that the driver has an intention to decelerate.

The above-mentioned idle-up determination can determine that, when the amount of fuel supplied to the engine, which is approximately proportional to the engine torque detected by the operating condition detecting device, is greater than or equal to a third predetermined value, the engine is in an idle-up state. Thus it can avoid an increase in the control load.

A gear change control apparatus of a multi-stage transmission according to a third embodiment of the present invention, wherein a sub transmission is connected to a main transmission on its output side, comprises: a gearshift device for changing the sub transmission; a main transmission changing unit for changing the main transmission; a sub transmission changing unit for changing the sub transmission; an operating condition detecting device for detecting an operating condition of an engine; and a control unit for inputting detected signals from the operating condition detecting device, and outputting control signals to the main transmission changing unit and the sub transmission changing unit based on the detected signals.

The control unit determines whether a vehicle is stopped or not based on the detected value of the operating condition detecting device. Next, it is determined whether a gear change operation to change said sub transmission to a drive gear by the gearshift device is performed or not. When it is determined that the vehicle is stopped, and it is determined that the gear change operation is performed, changing of the sub transmission changing unit is started, and afterwards, when the changing of the sub transmission is completed, or when the changing of the sub transmission is not completed even though a predetermined time has elapsed since changing started, the changing of the main transmission is started by the main transmission changing unit.

Owing to such a construction, when an operation is performed to change the gear to the drive gear while the vehicle is stopped, causing the sub transmission to change, changing of the sub transmission starts prior to changing of the main transmission. When the changing of the sub transmission starts, and is then completed, changing of the main transmission starts. On the other hand, when the change is not completed even though a predetermined time has elapsed since changing of the sub transmission started, it is determined that a batting state has occurred in the synchromesh mechanism of the sub transmission, and changing of the main transmission starts while the changing of the sub transmission is incomplete. Here, "batting state" means a state in which the synchronizing side and the side to be synchronized of a synchromesh mechanism are stopped completely, and the chamfered ends of a synchronizer sleeve and a synchronizer ring interfere.

When changing of the main transmission starts while changing of the sub transmission is incomplete, the main transmission is changed in a state in which the synchronizer sleeve of the synchromesh mechanism in the sub transmission is pushed away in the direction of the gear to be synchronized. When the clutch is engaged in this state, the main shaft of the main transmission and the counter shaft of the sub transmission rotate due to the output from the engine, and relative rotation occurs between them and the synchronizer sleeve of the synchromesh mechanism in the sub transmission. As a result, the batting state in the sub transmission is cancelled, thus enabling it to be changed. Furthermore, there is also a possibility that the main shaft is shaken by the shock accompanying the changing of the main transmission, so that the batting state in the sub transmission is cancelled.

For the vehicle stop determination, it may be determined whether the vehicle is stopped or not based on the vehicle speed detected by the operating condition detecting device.

In an apparatus for controlling a multi-stage transmission according to the third embodiment, a clutch is further connected to the input side of the main transmission, and there is provided a change state detecting device for detecting a change state of the main transmission, and an operating condition detecting device for detecting an operating condition of the clutch.

When it is detected that the main transmission is in the neutral position by the change state detecting device, and it is detected that the clutch is disengaged by the operating condition detecting device, the gear change operation determination can determine whether or not a gear change operation to change said sub transmission to a drive gear is performed. As a result, it is possible to detect the driver's intention to start moving the vehicle correctly, and hence appropriate gear change control of a multi-stage transmission is performed, which is consistent with the intention.

BRIEF DESCRIPTION OF THE DRAWINGS

FIG. 11 is a flow chart showing the content of multi-stage transmission control in the above embodiment.

FIG. 12 is a flow chart showing the content of multi-stage transmission control in the above embodiment.

DESCRIPTION OF THE PREFERRED EMBODIMENT

Figure 1:
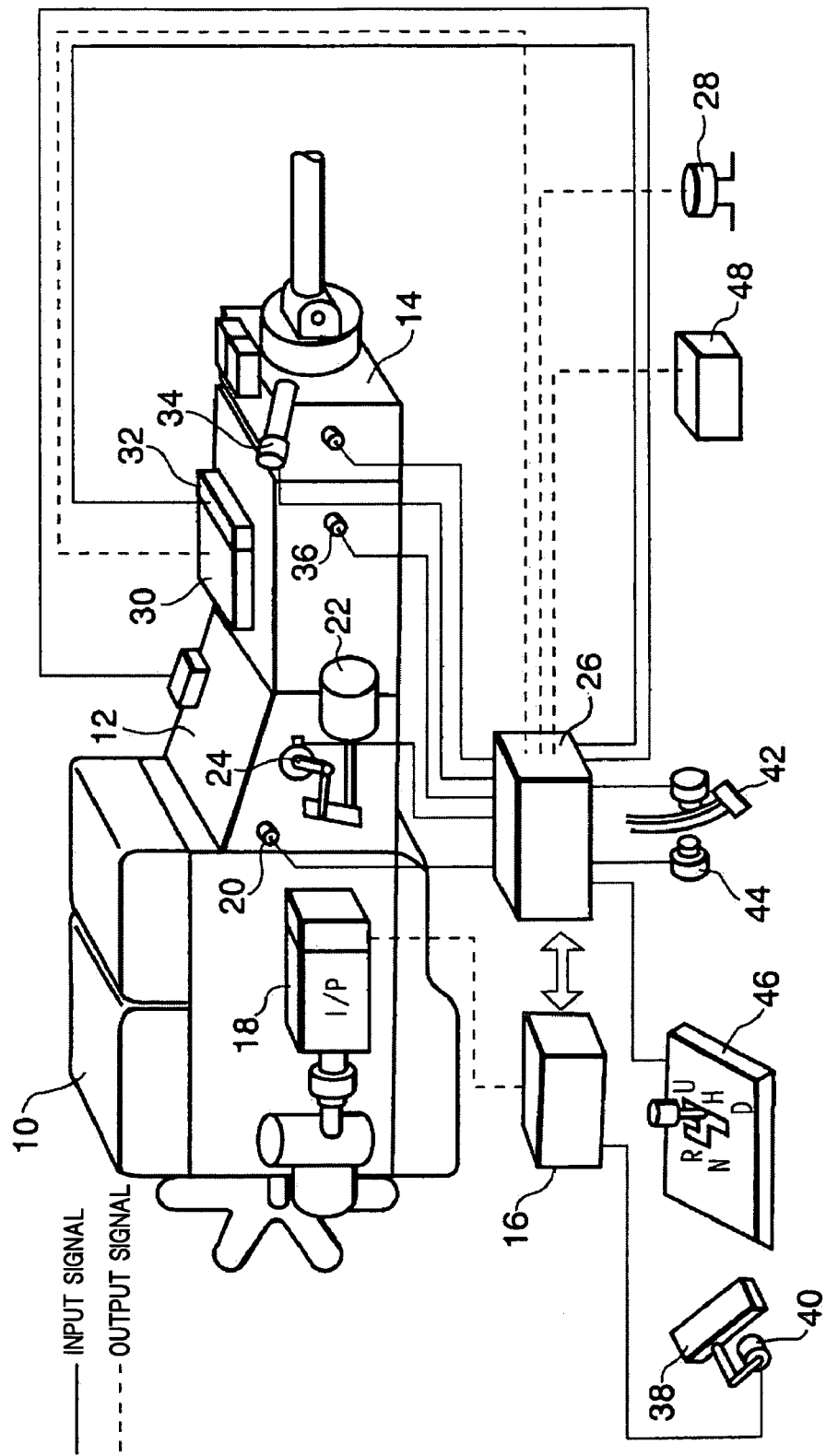
FIG. 1 is a block diagram of a vehicle that is provided with a control apparatus of an automatic transmission according to a first embodiment of the present invention.

FIG. 1 shows a control apparatus of an automatic transmission according to a first embodiment of the present invention.

A vehicle drive system is constructed in which an engine 10 is fitted in series with a gear type transmission (referred to hereunder as "transmission") 14 via a friction clutch (referred to hereunder as "clutch") 12. Furthermore, the engine 10 is fitted with a fuel injection pump 18 capable of controlling the fuel injection amount by an engine control unit 16 incorporating a microcomputer, and an engine rotational speed sensor 20 for detecting the engine rotational speed Ne. The clutch 12 has an output shaft of a clutch booster 22 connected thereto as a clutch drive device, and a clutch stroke sensor 24 for detecting its stroke L is fitted thereto.

On the other hand, the transmission 14 is fitted with an actuator (transmission changing device) 30 which changes the gear using a working fluid, via a solenoid valve 28 which is controlled to open and close by a transmission control unit 26 incorporating a microcomputer. Moreover, the transmission 14 is fitted with a position sensor 32 for detecting the gear change stages, a vehicle speed sensor 34 for detecting the vehicle speed V from the rotational speed of the output shaft thereof, and a counter rotational speed sensor 36 for detecting the rotational speed Nc of the counter shaft.

Stop intention condition determination, first gear change control, second gear change control, third gear change control, and fourth gear change control are respectively realized by the transmission control unit 26.

In the driver's cab there is provided; an accelerator opening sensor 40 for detecting the accelerator opening amount θ via the amount that an accelerator pedal 38 is pressed down, a brake switch 44 for detecting that a brake pedal 42 is pressed down, a shift lever 46 for inputting gear change instructions for the transmission 14, and a display monitor 48 for displaying the gear change stage of the transmission 14. An informing device such as a buzzer may also be included in the display monitor 48, for informing gear change completion, occurrence of abnormalities, and the like.

The signal from the accelerator opening sensor 40 is input to the engine control unit 16, and the fuel injection pump 18 is controlled according to the accelerator opening amount θ. On the other hand, the respective signals from the engine rotational speed sensor 20, the clutch stroke sensor 24, the position sensor 32, the vehicle speed sensor 34, the counter rotational speed sensor 36, the brake switch 44, and the shift lever 46, are input to the transmission control unit 26, and the clutch booster 22 and the solenoid valve 28 are controlled such that automatic gear change control or manual gear change control is performed while intercommunicating with the engine control unit 16.

Figure 2:
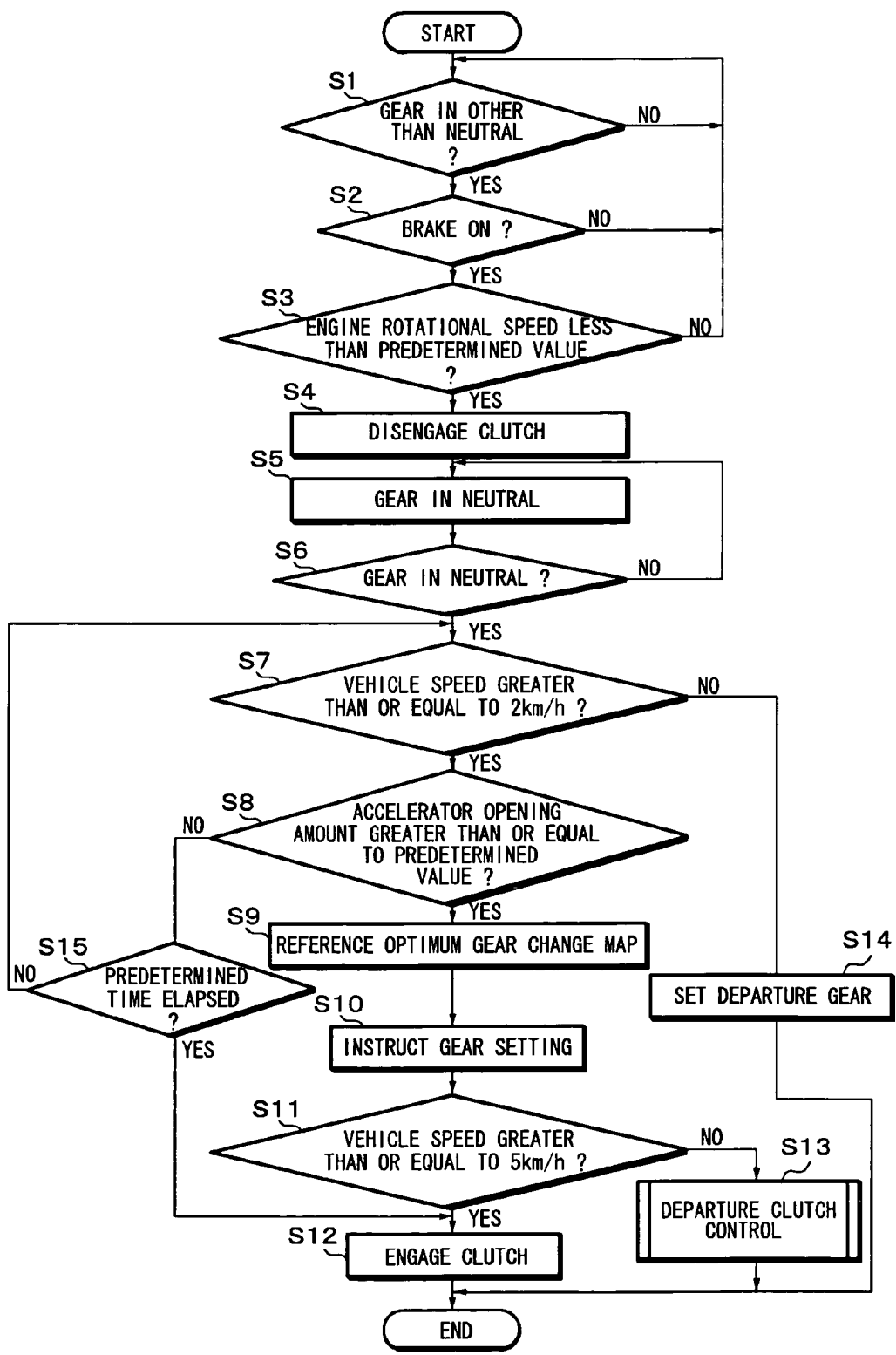
FIG. 2 is a flow chart of a main routine showing the content of gear change control in the above embodiment.
Figure 3:
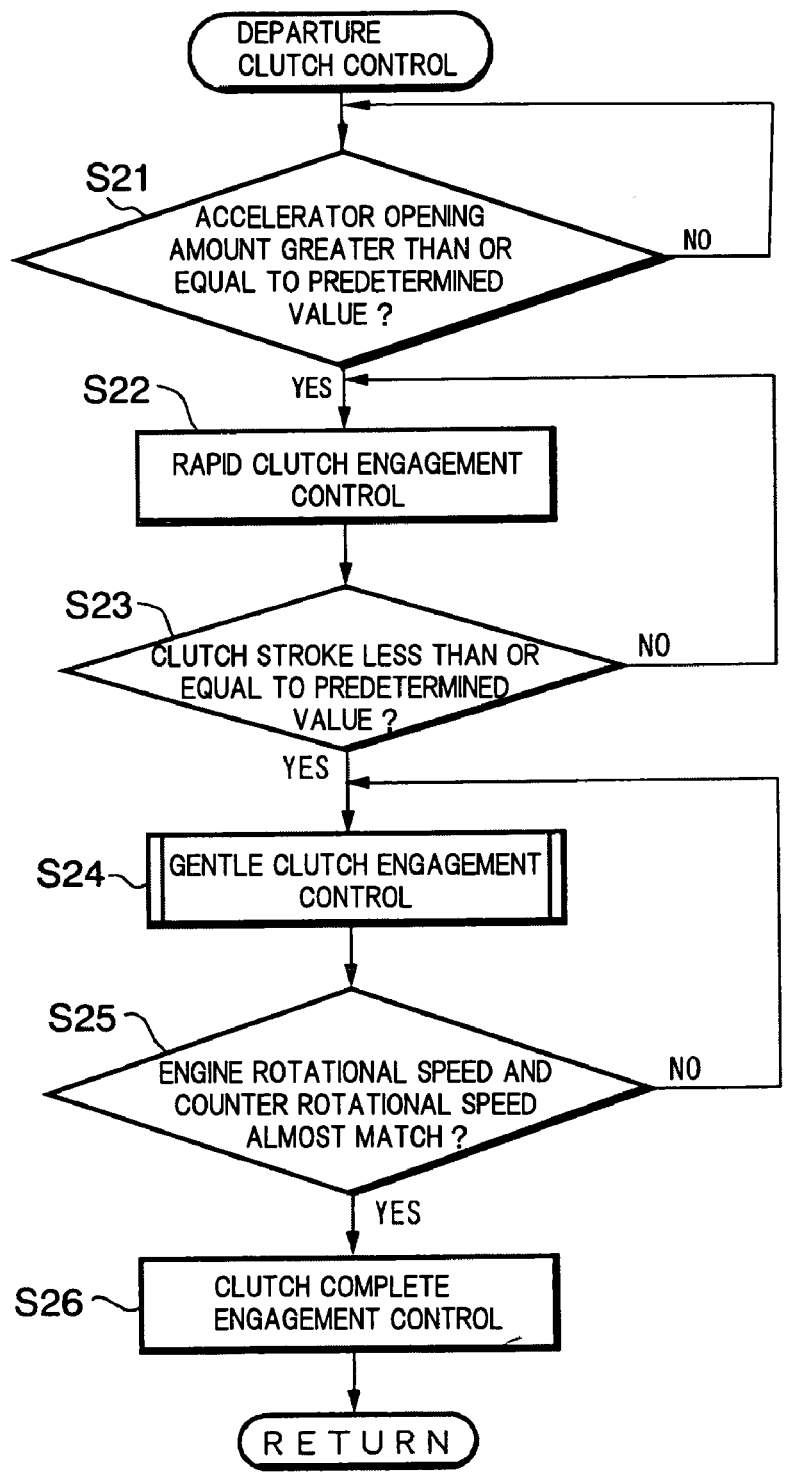
FIG. 3 is a flow chart of a subroutine that performs departure clutch control in the above embodiment.
Figure 4:
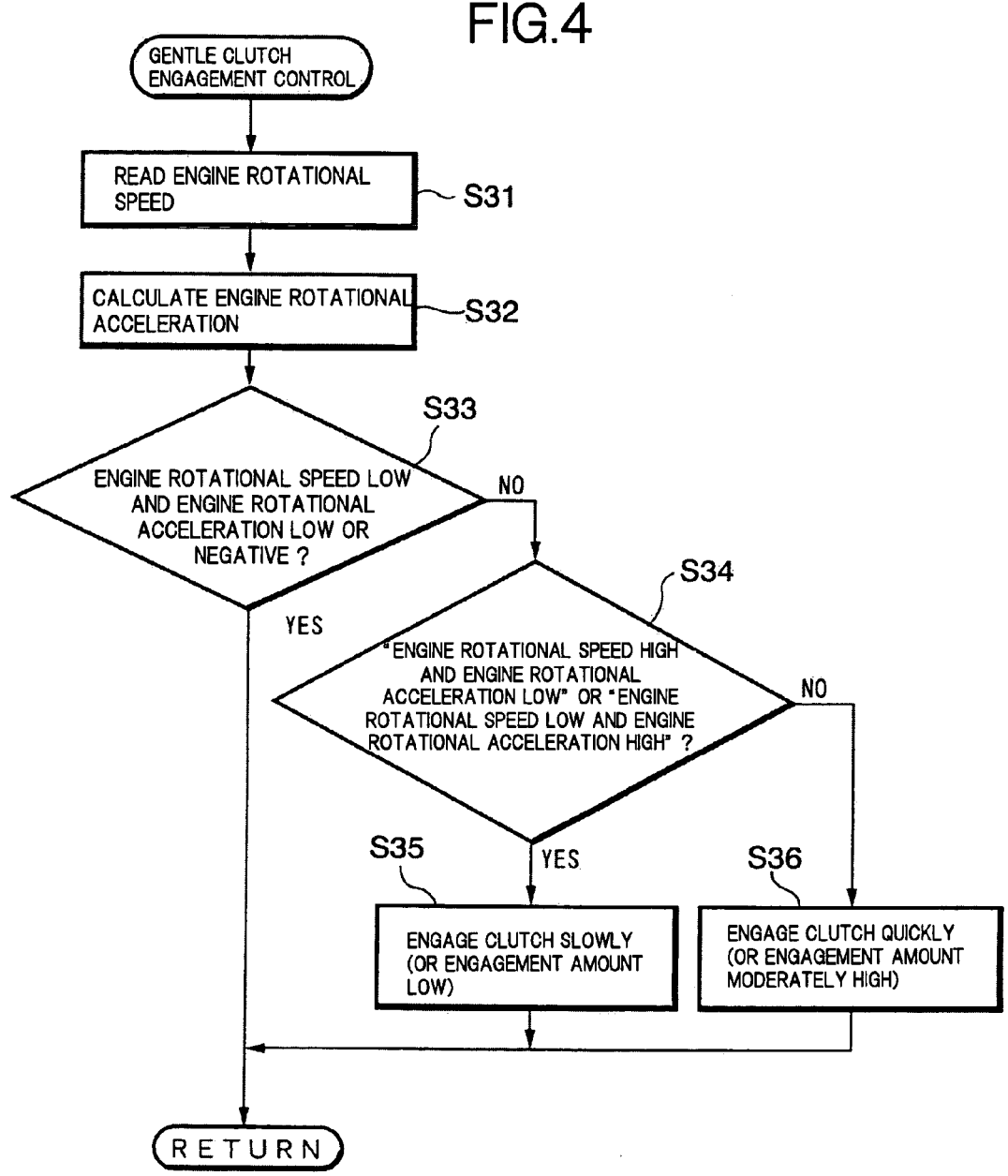
FIG. 4 is a flow chart of a subroutine that performs gentle clutch engagement control in the above embodiment.

FIG. 2 through FIG. 4 show a first embodiment of the content of gear change control by the transmission control unit 26. The gear change control is performed repeatedly at predetermined intervals after the engine 10 starts running.

In step 1 (abbreviated to "S1" in the figure, and similarly below), it is determined whether or not the transmission 14 is changed to other than the neutral position, meaning a drive gear (forward gear or reverse gear), based on a signal from the position sensor 32. If the transmission 14 is changed to other than the neutral position, control proceeds to step 2 (Yes), while if the transmission 14 is changed to the neutral position, control goes to standby (No).

In step 2, based on a signal from the brake switch 44, it is determined whether the brake is ON (operating) or not. If the brake is operating, control proceeds to step 3 (Yes), while if the brake is not operating, control returns to step 1 (No).

In step 3, based on a signal from the engine rotational speed sensor 20, it is determined whether the engine rotational speed Ne is less than a predetermined value or not. If the engine rotational speed Ne is less than the predetermined value, control proceeds to step 4 (Yes), while if the engine rotational speed Ne is greater than or equal to the predetermined value, control returns to step 1 (No). The arrangement may also be such that based on a signal from the vehicle speed sensor 34, it is determined whether the vehicle speed V is less than the predetermined value or not, instead of the engine rotational speed Ne.

Here the series of processing of step 1 to step 3 corresponds to the determination of a stop intention condition.

In step 4, the clutch booster 22 is controlled to disengage the clutch 12. After the clutch 12 is disengaged, the state is maintained.

In step 5, the solenoid valve 28 is operated to supply working fluid to the actuator 30, then gear change to the neutral position of the transmission 14 starts.

In step 6, based on a signal from the position sensor 32, it is determined whether the gear change to the neutral position of the transmission 14 is completed or not. If the gear change to the neutral position is completed, control proceeds to step 7 (Yes), while if the gear change to the neutral position is not completed, control returns to step 5 (No).

It is to be noted that the series of processing of step 4 to step 6 corresponds to the first gear change control.

In step 7, based on a signal from the vehicle speed sensor 34, it is determined whether the vehicle speed V is greater than or equal to 2 km/h (second predetermined value) or not. If the vehicle speed V is greater than or equal to 2 km/h, control proceeds to step 8 (Yes), while if the vehicle speed V is less than 2 km/h, control proceeds to step 14 (No).

In step 8, based on a signal from the accelerator opening sensor 40, it is determined whether the accelerator opening amount θ is greater than or equal to a predetermined value or not. If the accelerator opening amount θ is greater than or equal to the predetermined value, control proceeds to step 9 (Yes), while if the accelerator opening θ is less than the predetermined value, control proceeds to step 15 (No).

In step 9, by reference to an optimum gear change map, which is not shown in the figure, the gear (including the neutral position) corresponding to the vehicle speed V detected by the vehicle speed sensor 34 is determined.

In step 10, a gear setting instruction corresponding to the gear determined in step 9 is output. To be specific, the solenoid valve 28 is operated to supply working fluid to the actuator 30, and the transmission 14 is changed to the determined gear.

In step 11, based on a signal from the vehicle speed sensor 34, it is determined whether the vehicle speed V is greater than or equal to 5 km/h (first predetermined value) or not. If the vehicle speed V is greater than or equal to 5 km/h, control proceeds to step 12 (Yes), while if the vehicle speed V is less than 5 km/h, control proceeds to step 13 (No).

In step 12, the clutch booster 22 is controlled to engage the clutch 12.

In step 13, a subroutine as shown in FIG. 3 is called in order to perform departure clutch control at the time of departing.

Here, it is to be noted that the series of processing of step 8 to step 13, and processing of FIG. 3 and FIG. 4, which is described later, correspond to the second gear change control.

In step 14, the solenoid valve 28 is operated to supply working fluid to the actuator 30, and the transmission 14 is changed to the gear (departure gear) at the time of departing. The departure gear is preferably determined according to, for example, the loading weight of the vehicle.

Here, it is to be noted that the series of processing of step 7 to step 14 corresponds to the third gear change control.

In step 15, it is determined whether the clutch 12 is disengaged, and a predetermined time has elapsed since the transmission 14 was changed to the neutral position, or not. If the predetermined time has elapsed, it is determined that the vehicle is stopping, and control proceeds to step 12 in order to engage the clutch 12 (Yes). On the other hand, if the predetermined time has not elapsed, control returns to step 7 (No). The arrangement may also be such that instead of determining whether the predetermined time has elapsed or not, it is determined that the vehicle is stopping when the vehicle speed V is less than a predetermined value.

Here, it is to be noted that the series of processing of step 8, step 12 and step 15 corresponds to the fourth gear change control.

FIG. 3 shows the content of the processing of a subroutine that performs departure clutch control.

In step 21, based on a signal from the accelerator opening sensor 40, it is determined whether the accelerator opening amount θ is greater than or equal to a predetermined value or not. If the accelerator opening amount θ is greater than or equal to the predetermined value, control proceeds to step 22 (Yes), while if the accelerator opening θ is less than the predetermined value, control goes to standby (No).

In step 22, the clutch booster 22 is controlled to engage the clutch 12 quickly.

In step 23, based on a signal from the clutch stroke sensor 24, it is determined whether the clutch stroke L is less than or equal to a predetermined value or not. Here the predetermined value is a value at which it is determined whether the clutch 12 is in a half clutch state or not, and is set to an appropriate value according to the characteristics of the clutch 12. If the clutch stroke L is less than or equal to the predetermined value, control proceeds to step 24 (Yes), while if the clutch stroke L is greater than the predetermined value, control returns to step 22 (No).

In step 24, a subroutine (refer to FIG. 4), in which the clutch 12 is engaged gently according to the driving conditions, is called in order to engage the clutch 12 completely from the half clutch state.

In step 25, based on signals from the engine rotational speed sensor 20 and the counter rotational speed sensor 36, it is determined whether the engine rotational speed Ne and the counter rotational speed Nc are almost matched or not. If the engine rotational speed Ne and the counter rotational speed Nc almost coincide with each other, control proceeds to step 26 (Yes), while if the engine rotational speed Ne and the counter rotational speed Nc are not almost in coincidence with one another, control returns to step 24 (No).

In step 26, the clutch booster 22 is controlled to engage the clutch 12 completely.

FIG. 4 shows the content of the processing of a subroutine that performs gentle clutch engagement control.

In step 31, the engine rotational speed Ne is read from the engine rotational speed sensor 20.

In step 32, based on the rate of change of the engine speed Ne, the engine rotational acceleration α is calculated.

In step 33, it is determined whether or not the engine rotational speed Ne is relatively low and the engine rotational acceleration α is low or negative. If the conditions are satisfied, the processing of the present subroutine is terminated (Yes), while if the conditions are not satisfied, control proceeds to step 34 (No).

In step 34, it is determined whether or not either a condition that "the engine rotational speed Ne is relatively high and the engine rotational acceleration α is low" is satisfied, or another condition that "the engine rotational speed Ne is relatively low and the engine rotational acceleration α is high" is satisfied. If the conditions are satisfied, control proceeds to step 35 (Yes), while if the conditions are not satisfied, control proceeds to step 36 (No).

In step 35, the clutch booster 22 is controlled to engage the clutch 12 gently, or reduce the amount of engagement.

In step 36, the clutch booster 22 is controlled to engage the clutch 12 quickly, or increase the amount of engagement slightly.

According to the above-described gear change control, when the transmission 14 is in the drive gear, if the brake operates, and the engine rotational speed Ne falls to less than a predetermined value, it is possible to determine that the conditions of stopping the vehicle are satisfied. If the conditions of stopping the vehicle are satisfied, the clutch 12 is disengaged, and while maintaining this state, the transmission 14 is changed to the neutral position. Then if the vehicle speed V is greater than or equal to 2 km/h, and the accelerator opening amount $\theta$ is greater than or equal to a predetermined value, gear change is performed according to the vehicle speed V at the time. If the vehicle speed V is greater than or equal to 5 km/h after the gear change is performed, it is determined to be reacceleration from low speed, and the clutch 12 is engaged. On the other hand, if the vehicle speed V is less than 5 km/h after the gear change is performed, it is determined that reacceleration (starting moving again) occurs from an extremely low speed immediately before stopping, and thus, the clutch 12 is engaged gently (engagement via a half clutch state) according to the operating condition.

Furthermore, if the vehicle speed V is less than 2 km/h after the clutch 12 is disengaged, and the transmission 14 is changed to the neutral position, it is determined that the vehicle is stopping, and the transmission 14 is changed to a departure gear ready for departure. At this time, the clutch 12 remains disengaged.

Accordingly, even in the case where the vehicle decelerates, and then reaccelerates at an extremely low speed, for example where it decelerates in response to a stop signal and then reacceleration is required due to the signal changing just before stopping, when the transmission 14 changes to the neutral position, since the clutch 12 is maintained disengaged, it is not necessary to disengage it again. Therefore, it is possible to improve the speed of response. Moreover, when the vehicle stops, since the transmission 14 is changed to the departure gear and the clutch 12 is disengaged, it is possible to depart by merely engaging the clutch 12. Therefore, it is also possible to improve the speed of response at the time of departure. Furthermore, since the clutch 12 is controlled to engage gently when reaccelerating from an extremely low speed, it is possible to perform a smooth departure while preventing shock and engine stall at the time of engagement, for example.

Figure 5:
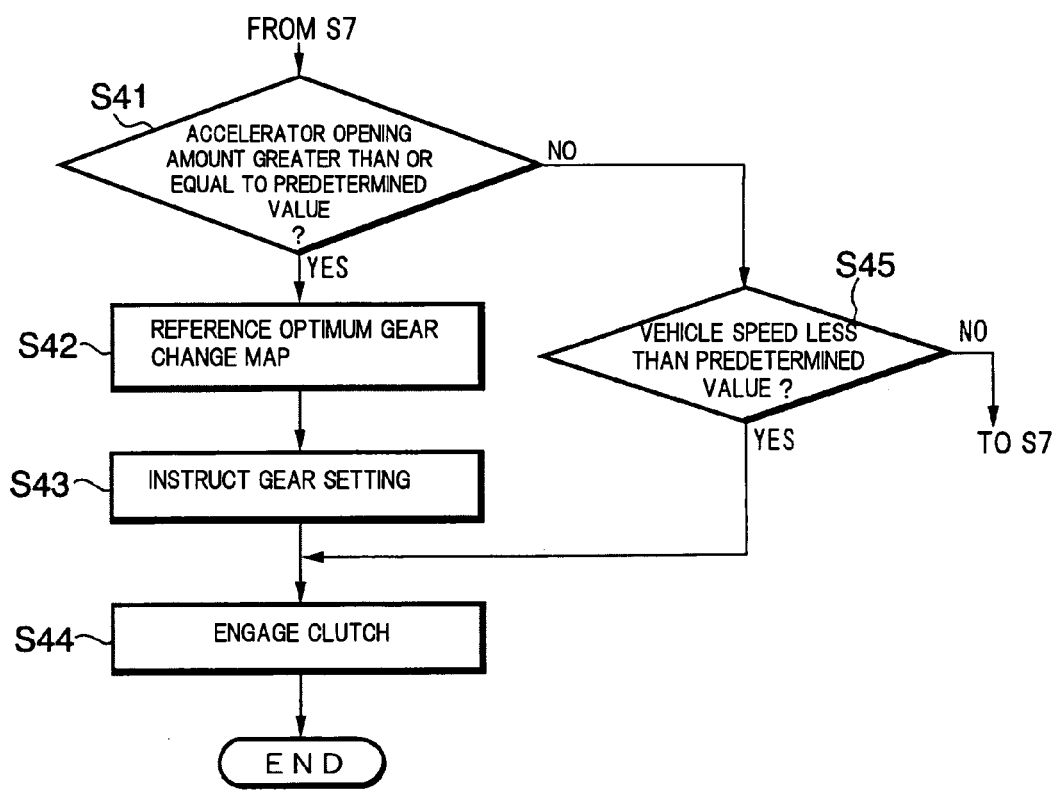
FIG. 5 is a flow chart showing another embodiment of the content of the gear change control shown in FIG. 2.

FIG. 5 shows another embodiment of the content of gear change control by the transmission control unit 26. In the content of gear change control in the present embodiment, step 1 to step 7 are the same as in the previous embodiment, so only control content that differs is described.

In step 41, based on a signal from the accelerator opening sensor 40, it is determined whether the accelerator opening $\theta$ is greater than or equal to a predetermined value or not. If the accelerator opening $\theta$ is greater than or equal to the predetermined value, control proceeds to step 42 (Yes), while if the accelerator opening $\theta$ is less than the predetermined value, control proceeds to step 45 (No).

In step 42, by reference to an optimum gear change map, which is not shown in the figure, the gear (including the neutral position) corresponding to the vehicle speed V detected by the vehicle speed sensor 34 is determined.

In step 43, a gear setting instruction corresponding to the gear determined in step 42 is output. More specifically, the solenoid valve 28 is operated to supply working fluid to the actuator 30, and the transmission 14 is changed to the determined gear.

In step 44, the clutch booster 22 is controlled to engage the clutch 12.

In step 45, based on a signal from the vehicle speed sensor 34, it is determined whether the vehicle speed V is less than a predetermined value or not. If the vehicle speed V is less than the predetermined value, it is determined that the vehicle is stopping, and control proceeds to step 44 (Yes). On the other hand, if the vehicle speed V is greater than or equal to the predetermined value, control returns to step 7 (No). The arrangement may also be such that it is determined that the vehicle is stopping when a predetermined time has elapsed since the clutch 12 was disengaged, and the transmission 14 was changed to the neutral position, instead of using the vehicle speed V.

Here, it is to be noted that the series of processing of step 41, step 44 and step 45 corresponds to the fourth gear change control.

According to the above-described gear change control, gear change control is performed to stop the vehicle, the clutch 12 is disengaged, the transmission 12 is changed to the neutral position, and afterwards, if the accelerator opening mount $\theta$ becomes greater than or equal to a predetermined value, it is changed to a gear according to the vehicle speed V at that time, and the clutch 12 is engaged. Therefore, if the accelerator pedal 38 is pressed down while moving at a low speed for stopping, gear change is performed in a state where the clutch 12 is disengaged, so that the clutch 12 does not need to be disengaged again for reacceleration, and hence it is possible to improve the speed of response. Furthermore, if the accelerator opening amount $\theta$ is less than the predetermined value, it is determined that the vehicle is stopping, and the clutch 12 is engaged.

As described above, according to the first embodiment, even in the case where a vehicle decelerates, and then reaccelerates at a low speed, since the friction clutch is maintained disengaged, it does not need to be disengaged again. Therefore, it is possible to change the gear to the drive gear straight away. Accordingly, at the time of reacceleration, it is not necessary to disengage the friction clutch to change the gear, and hence it is possible to improve the speed of response.

Figure 6:
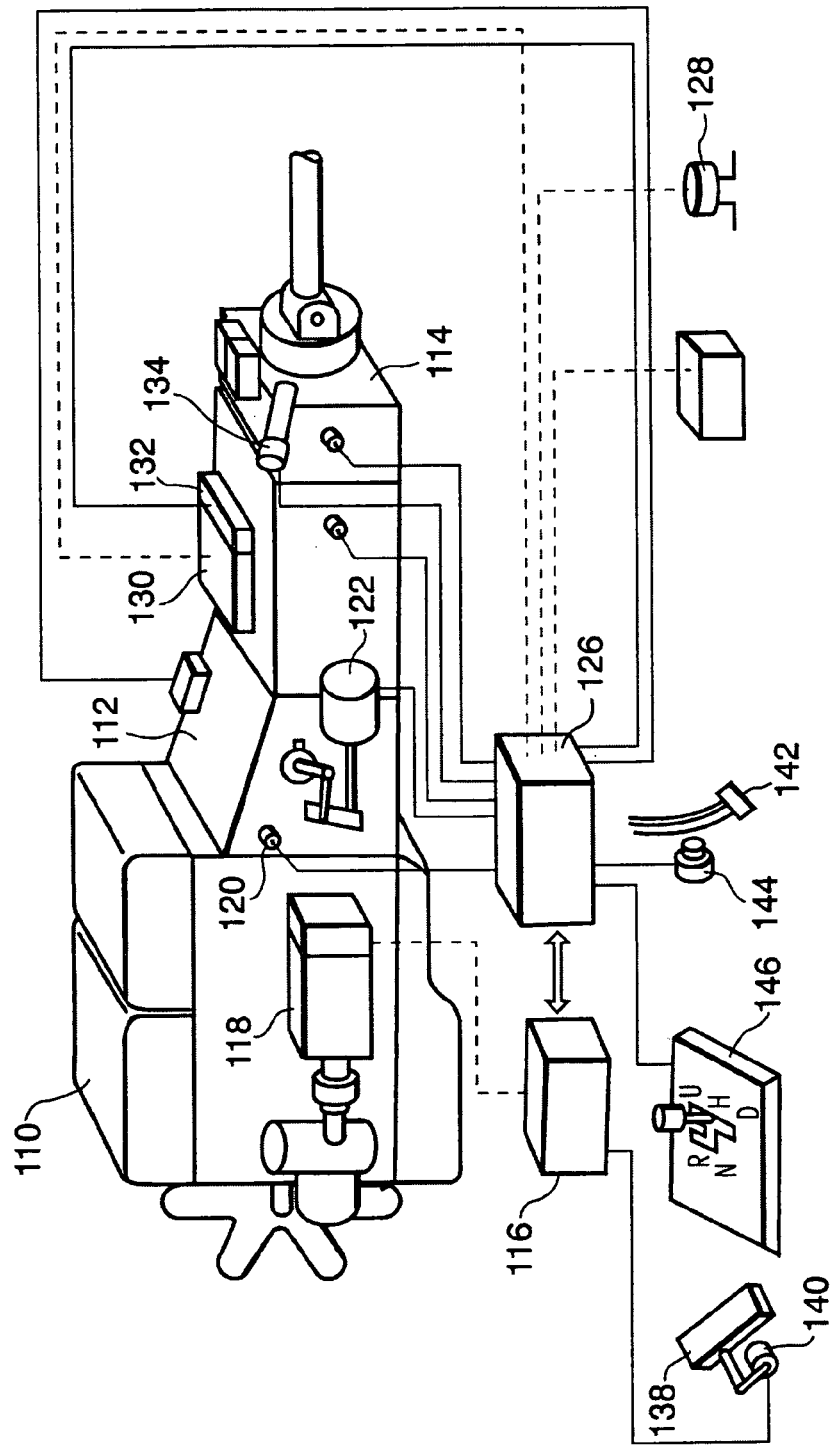
FIG. 6 is a block diagram of a vehicle that is provided with a control apparatus of an automatic transmission according to a second embodiment of the present invention.

FIG. 6 shows a block diagram of a vehicle that is provided with an apparatus for controlling an automatic transmission according to a second embodiment of the present invention. The components corresponding to the constituent components in the first embodiment shown in FIG. 1 have the same numerals but with 100 added.

A gear type transmission (referred to hereunder as "transmission") 114 is fitted to an engine 110 via a friction clutch (referred to hereunder as "clutch") 112. Furthermore, the engine 110 is fitted with a fuel injection pump 118 capable of controlling the fuel injection amount by an engine control unit 116 incorporating a microcomputer, and an engine rotational speed sensor 120 for detecting the engine rotational speed. The clutch 112 has an output shaft of a clutch booster 122 connected thereto as a clutch drive actuator.

On the other hand, a transmission 114 is fitted with an actuator (transmission changing device) 130 that changes the gear using pneumatic pressure via a solenoid valve 128, which is controlled to open and close by an automatic gear change control unit 126 incorporating a microcomputer. Moreover, the transmission 114 is fitted with a position sensor 132 (gear change stage detecting device) for detecting the gear change stage, and a vehicle speed sensor 134 for detecting the vehicle speed from the rotational speed of the output shaft.

In the driver's cab there is provided; an accelerator opening sensor 140 for detecting the accelerator opening amount via the amount that an accelerator pedal 138 is pressed down, a brake operation switch 144 for detecting that a brake pedal 142 is pressed down, and a shift lever 146 for inputting gear change instructions for the transmission 114.

Moreover, the signal from the accelerator opening sensor 140 is input to the engine control unit 116, and the fuel injection pump 118 is controlled according to the accelerator opening.

On the other hand, the respective signals from the engine rotational speed sensor 120, the position sensor 132, the vehicle speed sensor 134, the brake switch 144, and the shift lever 146, are input to the automatic gear change control unit 126, and the clutch booster 122 and the solenoid valve 128 are controlled such that automatic gear change control is performed while intercommunicating with the engine control unit 116. The sensors or the detecting devices constitute operating condition detecting devices.

Figure 7:
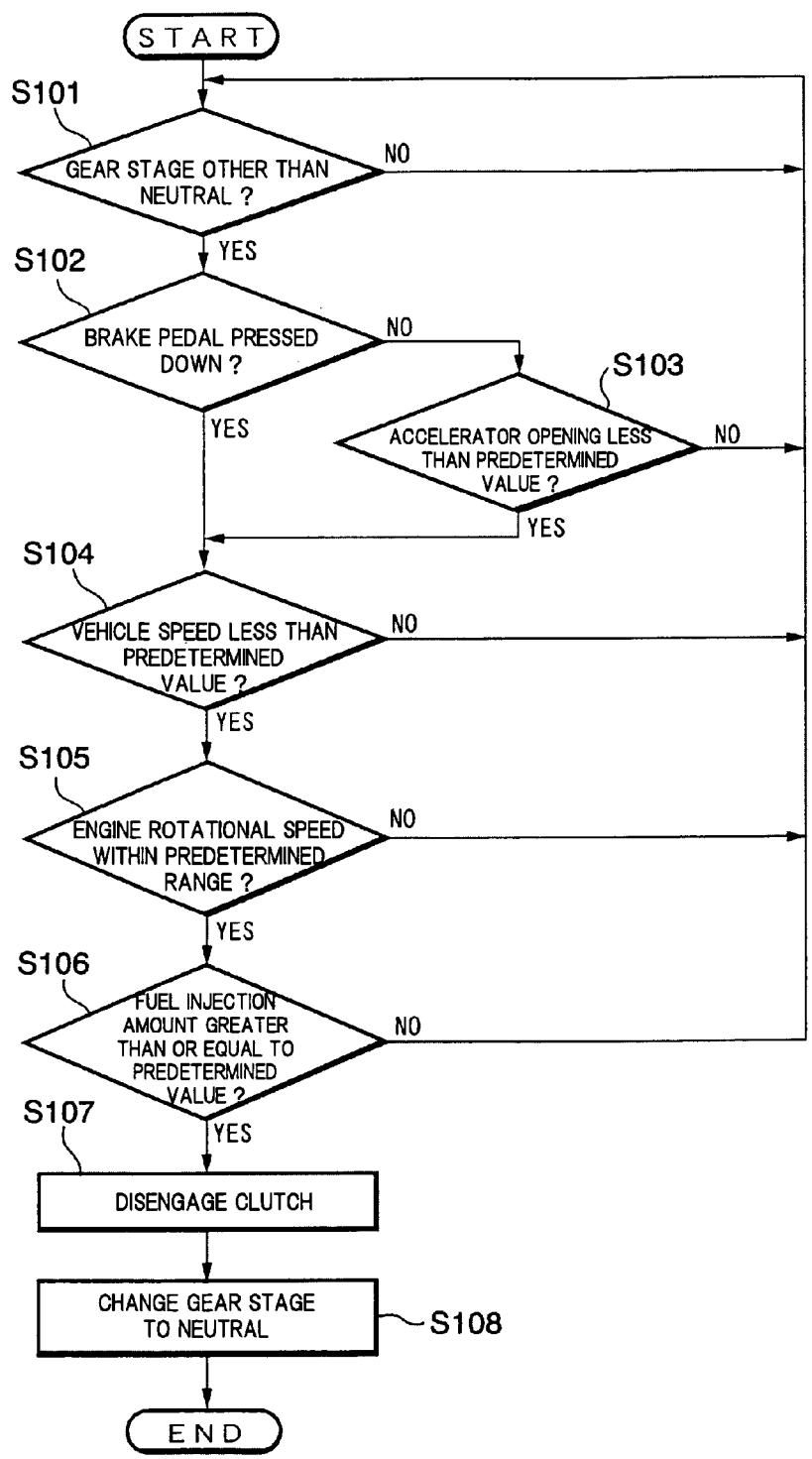
FIG. 7 is a flow chart showing the control procedure in an automatic transmission control unit in the above embodiment.

The automatic gear change control unit 126 is controlled according to a flow chart as shown in FIG. 7. The control by the flow chart shown in the figure is performed repeatedly at predetermined intervals.

After START, in step 101 (abbreviated to "S101" in the figure, and similarly below), it is determined whether the gear change stage of the transmission 114 detected by the position sensor 132, is other than the neutral position (whether it is a drive gear) or not. If it is determined to be other than the neutral position, control proceeds to step 102. If it is determined not to be other than the neutral position, step 101 is repeated.

In step 102, based on a signal from the brake operation switch 144, it is determined whether the brake pedal 142 is pressed down (the brake is operating) or not. If it is determined that the brake pedal 142 is pressed down, control proceeds to step 104. If it is determined that the brake pedal 142 is not pressed down, control proceeds to step 103.

In step 103, it is determined whether the accelerator opening detected by the accelerator opening sensor 140 is less than a predetermined value (a second predetermined value) or not. Here this predetermined value is set to 10 percent of the accelerator opening when the accelerator is fully open. If it is determined that the accelerator opening is less than the predetermined value, control proceeds to step 104. If it is determined that the accelerator opening is not less than the predetermined value, control returns to step 101. It is to be noted that the series of processing of steps 102 and 103 corresponds to a deceleration intention determination means. This is because when the vehicle stops from the drive stage, a braking operation is performed, or an operation is performed to release the accelerator pedal from being pressed down. Therefore, it is possible to determine that the driver has an intention to decelerate when these conditions are satisfied.

In step 104, it is determined whether the vehicle speed detected by the vehicle speed sensor 134 is less than a predetermined value (a first predetermined value) or not. If it is determined that the vehicle speed is less than the predetermined value, control proceeds to step 105. If it is determined that the vehicle speed is not less than the predetermined value, control returns to step 101.

In step 105, it is determined whether the engine rotational speed detected by the engine rotational speed sensor 120 is within a predetermined range or not. Here, this predetermined range is set to the engine rotational speed at which idling is stable, for example from 650 rpm to 950 rpm. If it is determined that the engine rotational speed is within the predetermined range, control proceeds to step 106. If it is determined that the engine rotational speed is not within the predetermined range, control returns to step 101.

In step 106, it is determined whether the fuel injection amount to the engine 110, controlled by the engine control unit 116, is greater than or equal to a predetermined value (a third predetermined value) or not. Here, this predetermined value is set to the fuel injection amount at which the torque of the engine 110 is 30 percent of its maximum torque. If it is determined that the fuel injection amount is greater than or equal to the predetermined value, control proceeds to step 107. If it is determined that the fuel injection amount is not greater than or equal to the predetermined value, control returns to step 101. It is to be noted that the processing of step 106 corresponds to the idle-up determination means. This is because when the driver has an intention to decelerate and the vehicle speed drops to less than the first predetermined value, if the fuel injection amount is greater than or equal to the third predetermined value, the engine torque is greater than that at normal idle time, and hence it is possible to determine that it is during idle-up control.

In step 107, a control signal is transmitted to the clutch booster 122 to disengage the clutch 112. Then control proceeds to step 108.

In step 108, a control signal is transmitted to the solenoid valve 128 to control operation of the actuator 130, and the gear change stage of the transmission 114 is changed to the neutral position. Afterwards, control proceeds to END, and terminates. It is to be noted that the series of processing of steps 107 and 108 corresponds to a gear change control means.

According to the automatic gear change control unit 126 constructed as described above, firstly, depending on whether the gear change stage is other than the neutral position or not, it is determined whether control according to the present invention is required or not. In the case where control according to the present invention is required, when the brake pedal is pressed down or the accelerator opening amount is less than the second predetermined value, it is determined that the driver has an intention to decelerate. At this time, if the vehicle speed is less than the first predetermined value, the engine rotational speed is within the predetermined range, and the fuel injection amount is greater than or equal to the third predetermined value, it is determined to be in an idle-up state, and the transmission 114 is changed to the neutral position automatically.

As a result, in an idle-up state, even if the engine rotational speed is greater than or equal to the rotational speed to change to the neutral position, control is performed to change the gear to the neutral position automatically. Accordingly, when stopping from the vehicle's drive stage, it is not necessary to press down the brake pedal 142 more strongly than necessary in order to force the engine rotational speed to drop. Therefore, it is possible to stop smoothly.

Figure 8:
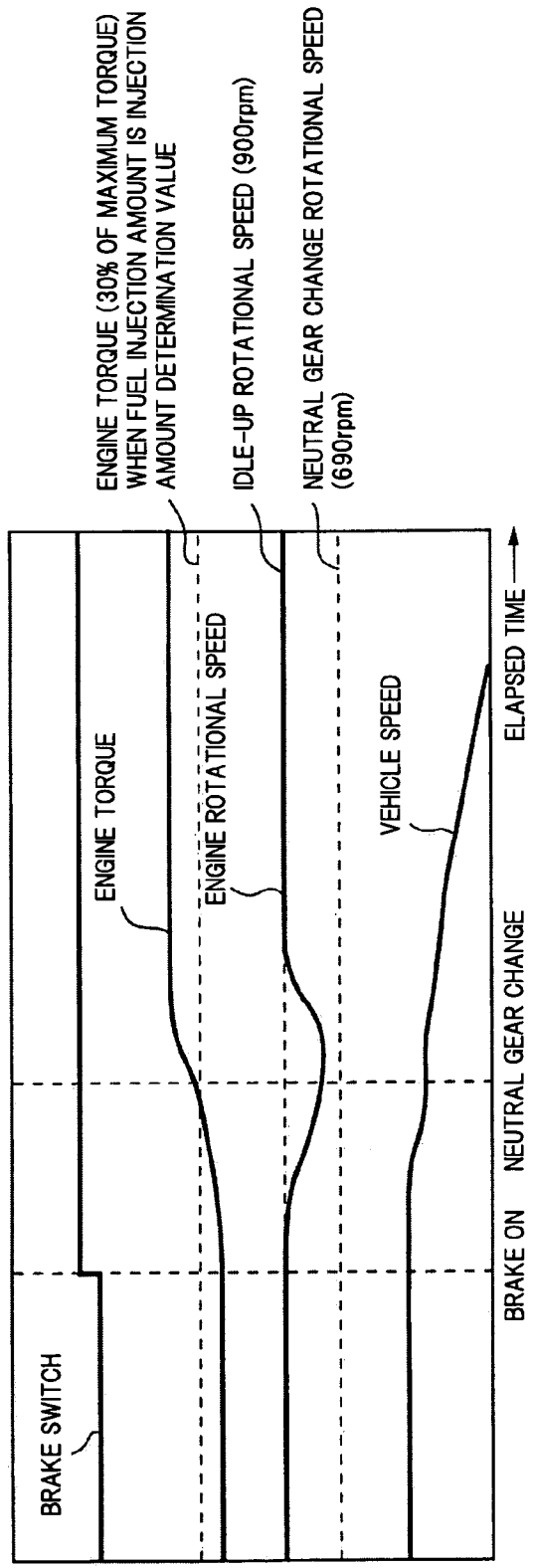
FIG. 8 is a timing chart showing a state of vehicle test running in the above embodiment.

FIG. 8 shows a timing chart for a vehicle incorporating the present embodiment being driven in an experiment. Here, the idle-up rotational speed is set to 900 rpm, and the rotational speed at which changing to the neutral position takes place is set to 690 rpm. As shown in FIG. 8, by operating the brake, the engine rotational speed drops. However, before the engine rotational speed reaches the rotational speed at which changing to the neutral position takes place, the gear is changed to the neutral position at the point in time that the engine torque exceeds 30 percent of its maximum torque.

As described above, according to the second embodiment, even in the case where the idle-up rotational speed is set to greater than the rotational speed at which changing to the neutral position takes place, the gear is changed to the neutral position when the vehicle stops from the drive stage. As a result, it is not necessary to press the brake pedal down more than necessary to operate the brake, thus enabling a smooth stop. Furthermore, it is possible to reduce the burden on the brake, and prevent the engine from stopping due to the drop in the engine rotational speed.

Figure 9:
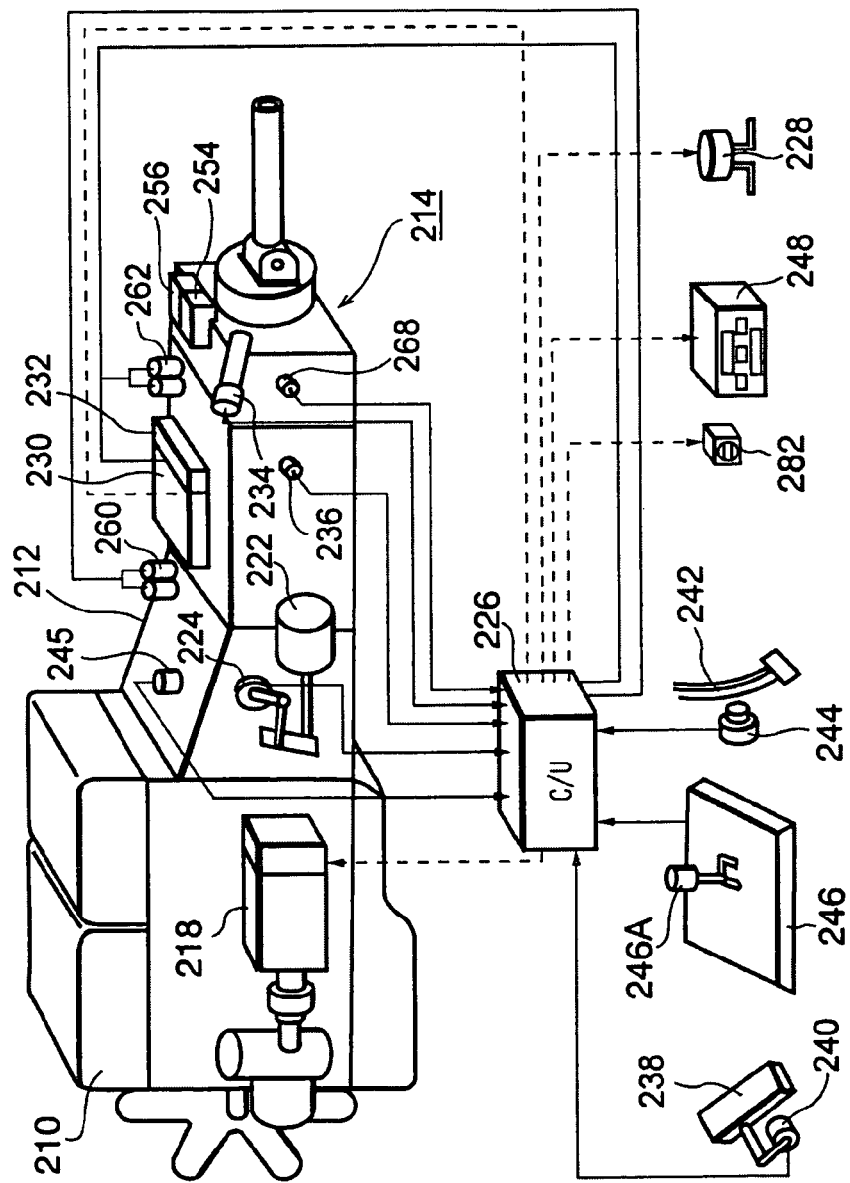
FIG. 9 is a block diagram of a vehicle that is provided with a gear change control apparatus of a multi-stage transmission according to a third embodiment of the present invention.

FIG. 9 shows the configuration of a vehicle containing a gear change control apparatus of a multi-stage transmission according to a third embodiment of the present invention.

Figure 10:
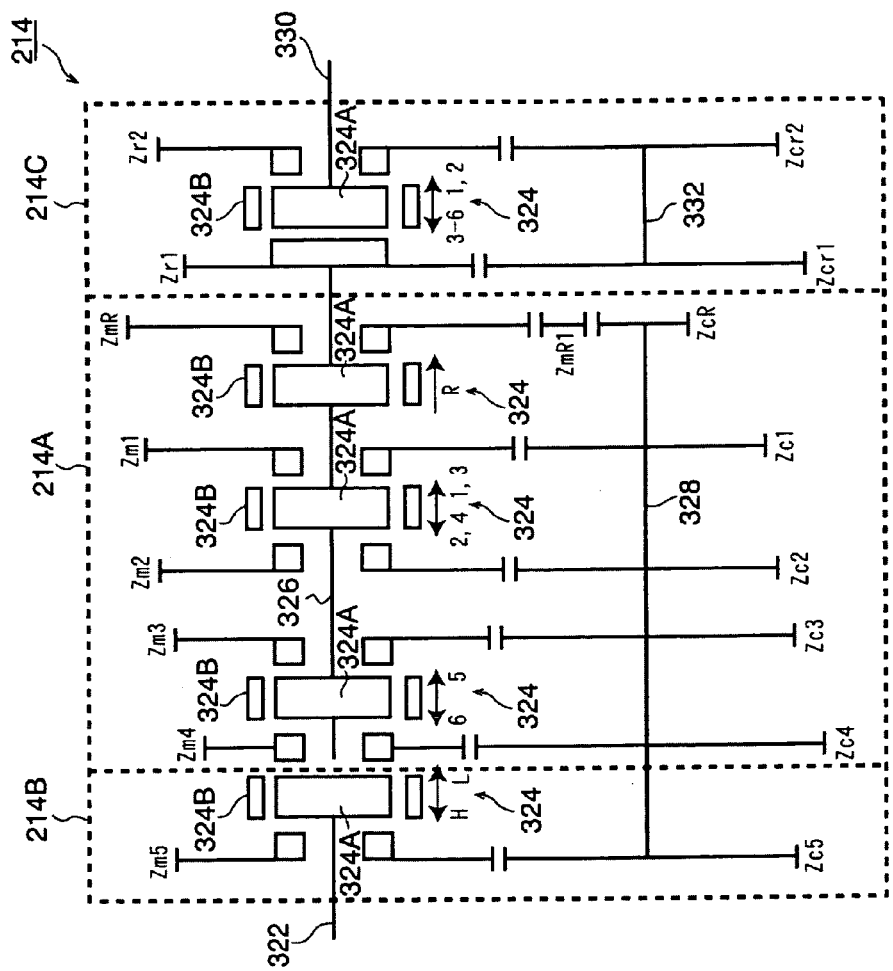
FIG. 10 is an explanatory diagram of the structure of the multi-stage transmission in the above embodiment.

An engine 210 is fitted with a multi-stage transmission 214 via a mechanical clutch (referred to hereunder as "clutch") 212. The multi-stage transmission 214, as shown in FIG. 10, has a construction in which a splitter 214B and a range 214C, serving as sub transmissions for changing to at least a high speed gear or a low speed gear, are connected to a main transmission 214A on its input side and output side respectively.

Here, a description of the multi-stage transmission 214 will be provided hereinbelow.

A splitter gear Zm5 for switching the splitter 214B to a high speed gear is fitted such that it can rotate freely on an input shaft 322 to which the output from the engine 210 is input, and a synchronizer hub 324A constituting a synchromesh mechanism 324 is fixed to the tip end thereof. A drive gear Zm4, a $3^{rd}$ speed gear Zm3, a $2^{nd}$ speed gear Zm2, a $1^{st}$ speed gear Zm1, and a reverse gear ZmR, which constitute the each gear of the main transmission 214A, are fitted on the main shaft 326 located on the same axis as the input shaft 322, such that they can rotate freely, and a high range gear Zr1 for switching the range 214C to a high speed gear is fixed to the tip end thereof. Synchronizer hubs 324A constituting synchromesh mechanisms 324 are fixed to the main shaft 326 between the drive gear Zm4 and the $3^{rd}$ speed gear Zm3, the $2^{nd}$ speed gear Zm2 and the $1^{st}$ speed gear Zm1, and the $1^{st}$ speed gear Zm1 and the reverse gear ZmR respectively.

On the other hand, a counter splitter gear Zc5, a counter drive gear Zc4, a counter $3^{rd}$ speed gear Zc3, a counter $2^{nd}$ speed gear Zc2, and a counter $1^{st}$ speed gear Zc1, which are always engaged with the splitter gear Zm5, the drive gear Zm4, the $3^{rd}$ speed gear Zm3, the $2^{nd}$ speed gear Zm2, and the $1^{st}$ speed gear Zm1 respectively, are fixed to a main counter shaft 328 arranged in parallel to the input shaft 322 and the main shaft 326. Furthermore, a counter reverse gear ZcR, which is always engaged with the reverse gear ZmR via a reverse idler gear ZmR1, is fixed to the main counter shaft 328.

A range low gear Zr2 for switching the range 214C to a low speed gear is fitted on the output shaft 330 located on the same axis as the main shaft 326, such that it can rotate freely about the output shaft 330, and a synchronizer hub 324A constituting a synchromesh mechanism 324 is fixed on one end of the output shaft 330. A range counter high gear Zcr1 and a range counter low gear Zcr2, which are always engaged with the range high gear Zr1 and the range low gear Zr2, are respectively fixed on a counter range shaft 332 arranged in parallel to the output shaft 330.

Furthermore, a synchronizer sleeve 324B which slides backward and forward in the direction of its axis due to an actuator, which is not shown in the figure, is connected using a spline on the periphery of each of the synchronizer hubs 324A constituting the synchromesh mechanisms 324. By sliding the synchronizer sleeve 324B in the direction of a gear to be synchronized, a synchronizer ring, which is not shown in the figure, is pressed onto the friction surface of the gear to be synchronized, and relative rotation between the synchronizing gear and the gear to be synchronized is eliminated by the friction, so that the two are synchronized.

In a multi-stage transmission 214 with such a constitution, six shift stages are formed using the main transmission 214A and the range 214C, and twelve forward shift stages and two reverse shift stages as indicated in Table 1, below are realized by shifting each of the shift stages by a half stage using the splitter 214B.

TABLE 1

| Shift Stage | Splitter | Main Transmission | Range |
|---|---|---|---|
| 1L | L | 1 | L |
| 1H | H | 1 | L |
| 2L | L | 2 | L |
| 2H | H | 2 | L |
| 3L | L | 1 | H |
| 3H | H | 1 | H |
| 4L | L | 2 | H |
| 4H | H | 2 | H |
| 5L | L | 3 | H |
| 5H | H | 3 | H |
| 6L | L | 4 | H |
| 6H | H | 4 | H |
| Rev L | L | Rev | L |
| Rev H | H | Rev | L |

The engine 210 is fitted with a fuel injection pump 218 capable of controlling the fuel injection amount by an engine control unit 226 incorporating a microcomputer, and a rotational speed sensor 245 for detecting the engine rotational speed. Furthermore, a clutch 212 has the output shaft of a clutch booster 222 connected thereto as a clutch drive actuator, and a clutch stroke sensor 224 (operating condition detecting means) for detecting the disengagement and engagement of the clutch based on the stroke amount is fitted thereto.

On the other hand, the multi-stage transmission 214 is fitted with a main actuator 230, a splitter actuator 254, and a range actuator 256, which switch the main transmission 214A, the splitter 214B, and the range 214C respectively using pneumatic pressure via a solenoid valve 228 which is controlled to open and close by a control unit 226. Moreover, the multi-stage transmission 214 is fitted with a main position sensor 232 (switching condition detecting means), a splitter position sensor 260, and a range position sensor 262, which detect the shift stages of the main transmission 214A, the splitter 214B, and the range 214C respectively. Furthermore, the multi-stage transmission 214 is fitted with a vehicle speed sensor 234 for detecting the vehicle speed from the rotational speed of the output shaft thereof, a main rotational speed sensor 236 for detecting the rotational speed of the main counter shaft 328, and a range rotational speed sensor 268 for detecting the rotational speed of the counter range shaft 332.

In the driver's cab there is provided an accelerator opening sensor 240 for detecting the amount that an accelerator pedal 238 is pressed down, a clutch pedal sensor 244 for detecting that the clutch pedal 242 is pressed, and a shift lever 246 (gear change instruction means) for inputting gear change instructions for the multi-stage transmission 214. A twelve speed switch 246A for designating whether the splitter 214B is switched to twelve stages or not is installed in the shift lever 246. In addition, a display monitor 248 for displaying the shift stage of the multi-stage transmission 214, a buzzer 282 for informing gear change completion, and the like, are provided in the driver's cab.

The output from each of the sensors, each of which constitutes an operating condition detecting device, is input to the control unit 226, and the fuel injection pump 218 is controlled according to the engine operating condition, and also the clutch booster 222, the solenoid valve 228, and the like, are controlled so as to perform an automatic gear change or a manual gear change.

The processing by the control unit 226 realizes vehicle stop determination, gear change operation determination, starting changing of the sub transmission, and starting changing of the main transmission.

FIG. 11 and FIG. 12 show the content of the control in the multi-stage transmission 214 at the time of departure of a vehicle, which is performed at predetermined intervals in the control unit 226.

In step 201 (abbreviated to "S201" in the figure, and similarly below), based on the output from the vehicle speed sensor 234, it is determined whether the vehicle is stopped or not. That is, it is determined whether the rotation of the synchronizer sleeve 324B of the synchromesh mechanism 324 in the range 214C is stopped or not. If it is determined that the vehicle is stopped, control proceeds to step 202 (Yes), while if it is determined that the vehicle is not stopped (it is moving), the processing terminates (No). It is to be noted that the processing of step 201 corresponds to the vehicle stop determination means.

In step 202, based on the output from the clutch stroke sensor 224, it is determined whether the clutch 212 is disengaged or not. If it is determined that the clutch 212 is disengaged, control proceeds to step 203 (Yes), while if it is determined that the clutch 212 is engaged, the processing terminates (No).

In step 203, based on an output from the shift lever 246, it is determined whether gear change has started or not. If it is determined that gear change has started, control proceeds to step 204 (Yes), while if it is determined that gear change has not started, the processing terminates (No).

In step 204, based on an output from the main position sensor 232, it is determined whether the main transmission 214A is in the neutral state or not. If it is determined that the main transmission 214A is in the neutral state, control proceeds to step 205 (Yes), while if it is determined that the main transmission 214A is not in the neutral state, the processing terminates (No).

In step 205, based on outputs from the main position sensor 232 and the shift lever 246, it is determined whether the range is switching or not. If it is determined that the range is switching, control proceeds to step 206 (Yes), while if it is determined that the range is not switching, the processing terminates (No). It is to be noted that the series of processing of step 201 to step 205 corresponds to the gear change operation determination means.

In step 206, in order to switch the range, a solenoid valve 228 is operated to control the drive of the range actuator 256.

In step 207, based on an output from the range position sensor 262, it is determined whether the range switching is completed or not. If it is determined that the range switching is completed, control proceeds to step 209 (Yes), while if it is determined that the range switching is not completed, control proceeds to step 208 (No).

In step 208, based on a timer incorporated in the control unit 226, it is determined whether a predetermined time has elapsed since the range switching started or not. If it is determined that the predetermined time has elapsed, control proceeds to step 209 (Yes), while if it is determined that the predetermined time has not elapsed, control returns to step 207 (No).

In step 209, in order to change the main transmission 214A, the solenoid valve 228 is operated to control the drive of the main actuator 230.

In step 210, based on the timer incorporated in the control unit 226, it is determined whether a predetermined time has elapsed since the changing of the main transmission 214A started. If it is determined that the predetermined time has elapsed, control proceeds to step 213 (Yes), while if it is determined that the predetermined time has not elapsed, control proceeds to step 211 (No).

In step 211, based on an output from the main position sensor 232, it is determined whether the changing of the main transmission 214A is completed or not. If it is determined that the changing of the main transmission 214A is completed, control proceeds to step 212 (Yes), and control goes to standby for a predetermined time. On the other hand, if it is determined that the changing of the main transmission 214A is not completed, control returns to step 210 (No).

In step 213, in order to stop the changing of the main transmission 214A and the range 214C, the operation of the solenoid valve 228 for controlling the drive of the main actuator 230 and the range actuator 256 is stopped.

According to the processing of step 201 to step 213 described above, when an operation is performed to change the gear to the drive gear while the vehicle is stopped, causing the range 214C to switch, switching of the range 214C starts prior to changing the main transmission 214A. Then, when the switching of the range 214C starts, and is then completed, changing of the main transmission 214A starts. On the other hand, when the change is not completed even though the predetermined time has elapsed since switching of the range 214C started, it is determined that a batting state has occurred in the synchromesh mechanism 324 of the range 214C, and changing of the main transmission 214A starts while the switching of the range is incomplete.

When changing of the main transmission 214A starts, the main transmission 214A is changed in a state in which the synchronizer sleeve 324B of the synchromesh mechanism 324 in the range 214C is pushed away toward the direction of the gear to be synchronized. Then when the clutch 212 is engaged in this state, the main shaft 326 and the counter range shaft 332 rotate due to the output from the engine 210, and relative rotation occurs between them and the synchronizer sleeve 324B of the synchromesh mechanism 324 in the range 214C. As a result, the batting state in the range 214C is cancelled, thus enabling the range to be switched. Furthermore, there is also a possibility that the main shaft 326 is shaken by the shock accompanying the changing of the main transmission 214A, so that the batting state in the range 214C is cancelled.

Accordingly, even if a batting state occurs in the range 214C while the vehicle is stopped, the main transmission 214A is changed while the switching of the range is incomplete. As a result, range switching is completed, and thus it is possible to reliably avoid a situation in which the vehicle cannot start.

A gear change control apparatus of a multi-stage transmission according to the present invention can be realized by only a small variation or modification to the existing control content. Therefore, there is little possibility of human errors accompanying a change in the control content, thus enabling an increase in cost, a drop in reliability, and the like, to be kept to a minimum.

As is clear from the above description, in accordance with the present invention embodied as the third embodiment, when the change of the sub transmission is not completed even after a predetermined time has elapsed, changing of the main transmission starts while changing of the sub transmission is incomplete. Therefore, relative rotation occurs between the main shaft of the main transmission, the counter shaft of the sub transmission, and the synchronizer sleeve of the synchromesh mechanism in the sub transmission, so that it is possible to cancel a batting state in the sub transmission. Furthermore, there is also a possibility that the main shaft is shaken by the shock accompanying the changing of the main transmission, so that the batting state in the sub transmission is cancelled.

INDUSTRIAL APPLICABILITY

As described above, an apparatus for controlling an automatic transmission according to the present invention has an excellent response in the case where a vehicle decelerates and is stopping, but then cancels it and tries to reaccelerate. Furthermore, it is possible to stop the vehicle smoothly even in an idle-up state. Moreover, in a multi-stage automatic transmission, even in a state in which the changing of a sub transmission does not progress smoothly, it is possible to eliminate batting states in the sub transmission by changing the main transmission. Therefore, gear changing by the automatic transmission is performed excellently in either case, and hence the controlling apparatus is extremely useful.

Many variations and modifications will occur to a person skilled in the art without departing from the scope and sprit of the invention as claimed in the accompanying claims.

We claim:

1. An apparatus for controlling an automatic transmission comprising:
   a vehicle drive system in which a gear type transmission and a friction clutch are connected in series;
   a gear changing device for changing said gear type transmission;
   a clutch drive device for disengaging and engaging said friction clutch;
   an operating condition detecting device for detecting an operating condition of an engine; and
   a control unit for inputting detected signals from said operating condition detecting device, and outputting control signals to said gear changing device and said clutch drive device based on the detected signals,
   wherein said control unit determines whether a stop intention condition of a driver is satisfied or not, and performs
   first gear change control for, if said stop intention condition is determined to be satisfied, disengaging said friction clutch and changing said gear type transmission to a neutral position, and
   second gear change control for, when an accelerator opening becomes greater than or equal to a predetermined value, after said friction clutch is disengaged and said gear type transmission is changed to the neutral position by said first gear change control, changing said gear type transmission to a gear according to a vehicle speed, and engaging said friction clutch.

2. The apparatus for controlling an automatic transmission according to claim 1, wherein said second gear change control, when the vehicle speed is less than a first predetermined value, engages said friction clutch gradually via a half clutch state.

3. The apparatus for controlling an automatic transmission according to claim 2, wherein said control unit, after said friction clutch is disengaged and said gear type transmission is changed to the neutral position by said first gear change control, if the vehicle speed is less than a second predetermined value, which is less than said first predetermined value, performs a third gear change control to change said gear type transmission to a departure gear.

4. The apparatus for controlling an automatic transmission according to claim 1, wherein said control unit, after said friction clutch is disengaged and said gear type transmission is changed to the neutral position by said first gear change control, if an accelerator opening amount is less than said predetermined value, and vehicle speed is less than a third predetermined value, performs a fourth gear change control to engage said friction clutch.

5. The apparatus for controlling an automatic transmission according to claim 4, wherein said fourth gear change control, after said friction clutch is disengaged and said gear type transmission is changed to the neutral position by said first gear change control, when a state in which said accelerator opening amount is less than said predetermined value is maintained for a predetermined time, engages said friction clutch.

6. The apparatus for controlling an automatic transmission according to claim 1, wherein said stop intention determination determines that stop intention conditions are satisfied when said gear type transmission is changed to a drive gear, a brake is operated, and an engine rotational speed is less than a predetermined value, or a vehicle speed is less than a fourth predetermined value.

7. An apparatus for controlling an automatic transmission comprising:
   a vehicle drive system in which a gear type transmission and a friction clutch are connected in series;
   a gear changing device configured to change said gear type transmission;
   a clutch drive device configured to disengage and engage said friction clutch;
   an operating condition detecting device configured to detect an operating condition of an engine; and
   a control unit configured to input detected signals from said operating condition detecting device, and output control signals to said gear changing device and said clutch drive device based on the detected signals, wherein
   said control unit comprises:
   means for determining whether a stop intention condition of a driver is satisfied or not;
   first gear change control means for, if said stop intention condition is determined to be satisfied, disengaging said friction clutch and changing said gear type transmission to the neutral position; and
   second gear change control means for, when an accelerator opening amount becomes greater than or equal to a predetermined value, after said friction clutch is disengaged and said gear type transmission is changed to the neutral position by said first gear change control means, changing said gear type transmission to a gear according to a vehicle speed, and engaging said friction clutch.

8. An apparatus for controlling an automatic transmission comprising:
   a gear change stage detecting device configured to detect a gear change stage of a gear type transmission;
   a gear changing device configured to change the gear of said gear type transmission;
   an operating condition detecting device configured to detect an operating condition of an engine; and a control unit configured to input detected signals from said operating condition detecting device, and output control signals to said gear changing device based on the detected signals, wherein said control unit determines whether a driver has an intention to decelerate or not based on a value detected by said operating condition detecting device, and determines whether the engine is in an idle-up state or not based on an engine torque detected by said operating condition detecting device, and performs gear change control to change the gear of said gear type transmission to a neutral position when determined that a gear change stage detected by said gear change stage detecting device is a drive gear, and that there is an intention to decelerate by said deceleration intention determination, and determined that said vehicle speed detected by said operating condition detecting device is less than a first predetermined value and that it is in an idle-up state by said idle-up determination.

9. The apparatus for controlling an automatic transmission according to claim 8, wherein said deceleration intention determination, determines that the driver has an intention to decelerate when it is determined, based on the detected value of said operating condition detecting device that a brake is operated, or an accelerator opening amount is less than a second predetermined value.

10. The apparatus for controlling an automatic transmission according to claim 8, wherein said idle-up determination, determines that the engine is in an idle-up state when it is determined that the amount of fuel supplied to the engine, which is approximately proportional to the engine torque is greater than or equal to a third predetermined value, based on a detection value of said operating condition detecting device.

11. An apparatus for controlling an automatic transmission comprising:

gear change stage detecting device configured to detect a gear change stage of a gear type transmission;

gear changing device configured to change the gear of said gear type transmission;

operating condition detecting device configured to detect an operating condition of an engine; and a control unit configured to input detected signals from said operating condition detecting device, and output control signals to said gear changing device based on the detected signals, wherein said control unit comprises:

means for determining whether a driver has an intention to decelerate or not based on a value detected by said operating condition detecting device, means for determining whether the engine is in an idle-up state or not based on an engine torque detected by said operating condition detecting device, and gear change control means for changing the gear of said gear type transmission to a neutral position when determined that a gear change stage detected by said gear change stage detecting device is a drive gear, and that there is an intention to decelerate by said deceleration intention determination means, and determined that said vehicle speed detected by said operating condition detecting device is less than a first predetermined value and that it is in an idle-up state by said idle-up determination.

12. A gear change control apparatus of a multi-stage transmission wherein a sub transmission is connected to a main transmission on its output side, comprising:

a gearshift device configured to change said multi-stage transmission;

a main transmission changing unit configured to change said main transmission;

a sub transmission changing unit configured to change said sub transmission;

an operating condition detecting device configured to detect an operating condition of an engine; and a control unit configured to input detected signals from said operating condition detecting device, and output control signals to said main transmission changing unit and said sub transmission changing unit based on said detected signals, wherein said control unit:

determines whether a vehicle is stopped or not based on the detected value of said operating condition detecting device;

determines whether a gear change operation to change said sub transmission to a drive gear is performed by said gearshift device or not;

and when it is determined that the vehicle is stopped, and it is determined that said gear change operation is performed, starts changing of said sub transmission changing unit, and afterwards, when the changing of said sub transmission is completed, or when the changing of said sub transmission is not completed even though a predetermined time has elapsed since changing started, starts the changing of said main transmission by said main transmission changing unit.

13. The gear change control apparatus of a multi-stage transmission according to claim 12, wherein said vehicle stop determination determines whether the vehicle is stopped or not based on a vehicle speed detected by said operating condition detecting device.

14. The gear change control apparatus of a multi-stage transmission according to claim 13, wherein;

a clutch is connected to an input side of said main transmission, and there is provided a change state detecting device configured to detect a change state of said main transmission, and an driving condition detecting device configured to detect an operating condition of said clutch, and said gear change operation determination, when it is detected that said main transmission is in the neutral position by said change state detecting device, and it is detected that said clutch is disengaged by said driving condition detecting device, determines whether or not a gear change operation to change said sub transmission to a drive gear is performed.

15. A gear change control apparatus of a multi-stage transmission in which a sub transmission is connected to a main transmission on its output side, comprising:

gearshift means for changing said multi-stage transmission;

main transmission changing means for changing said main transmission;

sub transmission changing means for changing said sub transmission;

operating condition detecting means for detecting an operating condition of an engine; and a control unit for inputting detected signals from said operating condition detecting means, and outputting control signals to said main transmission changing means and said sub transmission changing means based on said detected signals, wherein said control unit comprises:

means for determining whether a vehicle is stopped or not based on the detected value of said operating condition detecting means;

means for determining whether a gear change operation to change said sub transmission to a drive gear is performed by said gearshift means or not, and for starting changing of said sub transmission changing when it is determined that the vehicle is stopped, and it is determined that said gear change operation is performed; and means for starting changing of said main transmission by said main transmission changing means afterwards, when the changing of said sub transmission is completed, or when the changing of said sub transmission is not completed even though a predetermined time has elapsed since changing started.

* * * * *